(12) United States Patent
Leoni et al.

(10) Patent No.: US 10,793,381 B2
(45) Date of Patent: Oct. 6, 2020

(54) BELT DRIVE FOR REWRITABLE DISPLAY MEDIUM

(71) Applicant: Hewlett-Packard Development Company, L.P., Houston, TX (US)

(72) Inventors: Napoleon J Leoni, Palo Alto, CA (US); Chuangyu Zhou, Palo Alto, CA (US); Henryk Birecki, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 357 days.

(21) Appl. No.: 15/764,246

(22) PCT Filed: Oct. 30, 2015

(86) PCT No.: PCT/US2015/058372
§ 371 (c)(1),
(2) Date: Mar. 28, 2018

(87) PCT Pub. No.: WO2017/074430
PCT Pub. Date: May 4, 2017

(65) Prior Publication Data
US 2018/0275784 A1 Sep. 27, 2018

(51) Int. Cl.
*B65H 5/02* (2006.01)
*G02F 1/167* (2019.01)
(Continued)

(52) U.S. Cl.
CPC ............ *B65H 5/026* (2013.01); *B41J 3/4076* (2013.01); *B41J 11/005* (2013.01); *B41J 13/08* (2013.01); *G02F 1/167* (2013.01)

(58) Field of Classification Search
CPC ........ B41J 3/4076; B41J 13/08; B41J 11/007; B41J 13/10; B41J 13/14; B41J 13/18;
(Continued)

(56) References Cited

U.S. PATENT DOCUMENTS

| 6,333,754 B1 | 12/2001 | Oba et al. |
| 6,742,948 B2 * | 6/2004 | Feiner ................. B41J 11/0005 26/98 |

(Continued)

FOREIGN PATENT DOCUMENTS

| CN | 1252538 | 5/2000 |
| CN | 1479153 | 3/2004 |

(Continued)

*Primary Examiner* — Jeremy R Severson
(74) *Attorney, Agent, or Firm* — Dicke Billig & Czaja PLLC

(57) ABSTRACT

A belt drive includes a belt and at least one pair of spaced apart rails extending in a first direction and defining a gap. The belt is aligned with the gap and to be driven in an endless loop with the belt including a first movable portion external to the gap on a first side of the rails and a second movable portion biased to be recessed within the gap on an opposite second side of the rails. A rewritable display medium is releasably engageable in a sandwiched position between a slidable contact surface of the rails and a first segment of the second movable portion external to the gap to move the display medium in the first direction for contact-less imaging via a unit spaced from the rails.

15 Claims, 6 Drawing Sheets

(51) Int. Cl.
*B41J 3/407* (2006.01)
*B41J 13/08* (2006.01)
*B41J 11/00* (2006.01)

(58) Field of Classification Search
CPC ......... G09F 9/372; G09F 9/375; B65H 5/021; B65H 5/026
See application file for complete search history.

(56) References Cited

U.S. PATENT DOCUMENTS

| | | | |
|---|---|---|---|
| 7,114,864 | B2 | 10/2006 | Shimoda et al. |
| 8,393,075 | B2 | 3/2013 | Yuyama et al. |
| 8,408,829 | B2 * | 4/2013 | Kawaguchi ............ B41J 11/003 347/198 |
| 8,514,256 | B2 | 8/2013 | Ogawa et al. |
| 10,162,430 | B2 * | 12/2018 | Birecki .................. G09G 3/001 |
| 10,224,002 | B2 * | 3/2019 | Leoni ....................... G09G 5/24 |
| 2010/0026634 | A1 | 2/2010 | Tsai et al. |
| 2011/0298760 | A1 | 12/2011 | Gila et al. |

FOREIGN PATENT DOCUMENTS

| | | |
|---|---|---|
| JP | 2001301213 | 10/2001 |
| JP | 2008-114460 A | 5/2008 |
| JP | 2012-037769 A | 2/2012 |
| WO | WO-2015-099672 A1 | 7/2015 |
| WO | WO-2015116215 A1 | 8/2015 |

* cited by examiner

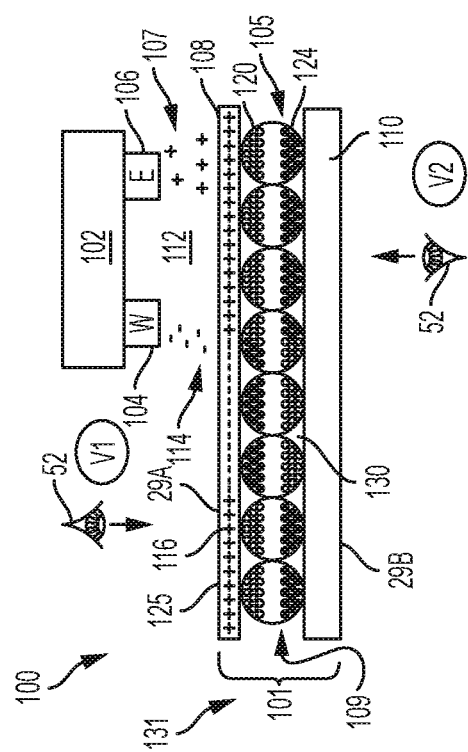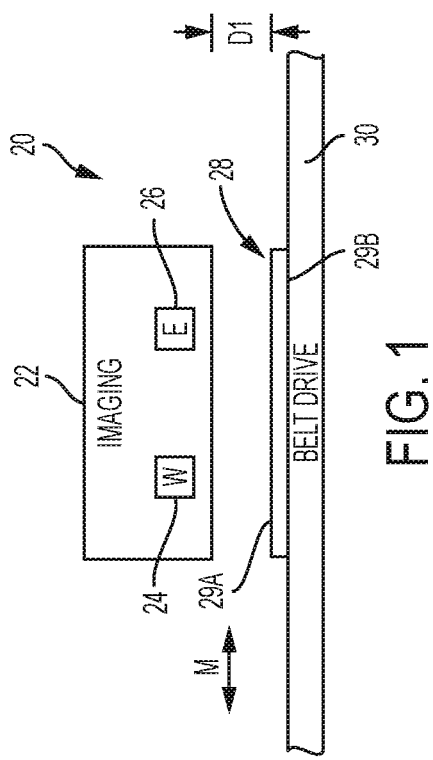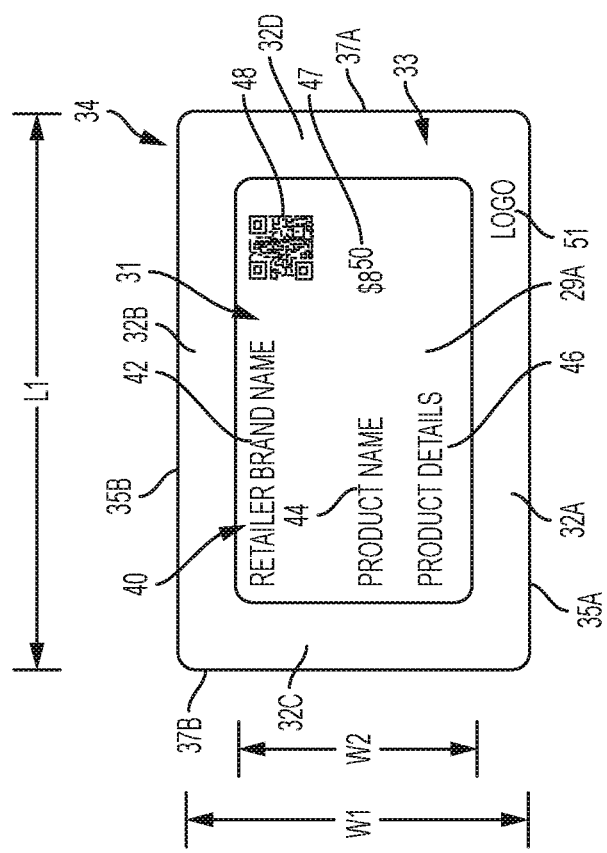
FIG. 1
FIG. 2
FIG. 3
FIG. 4

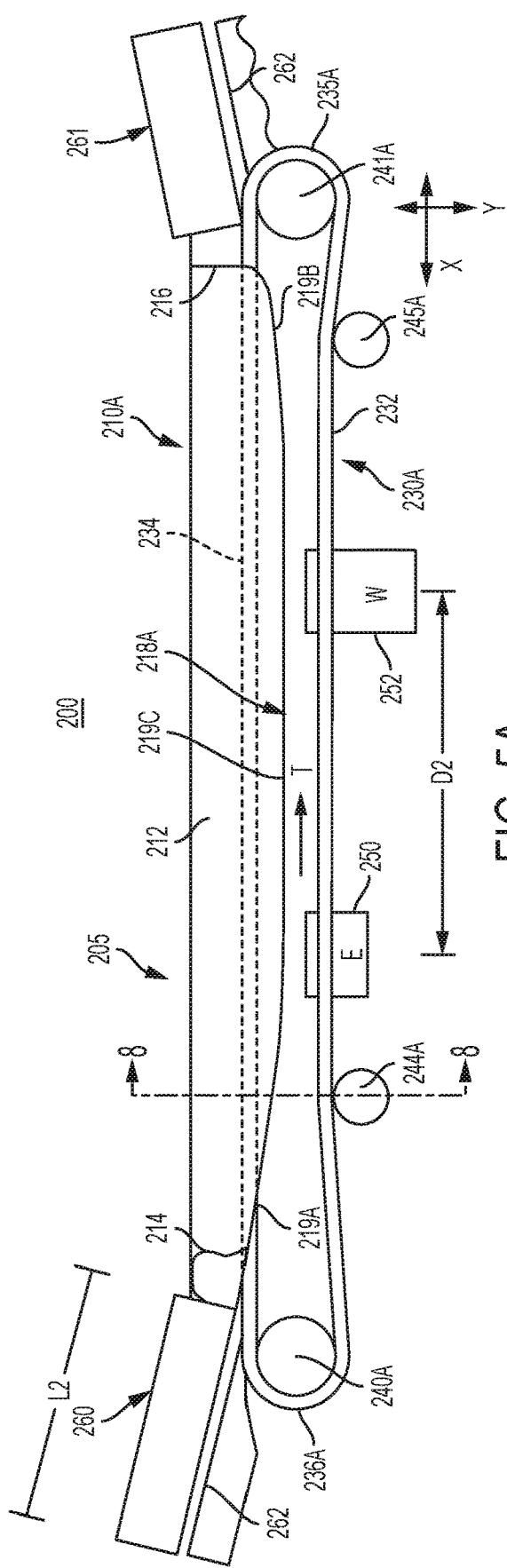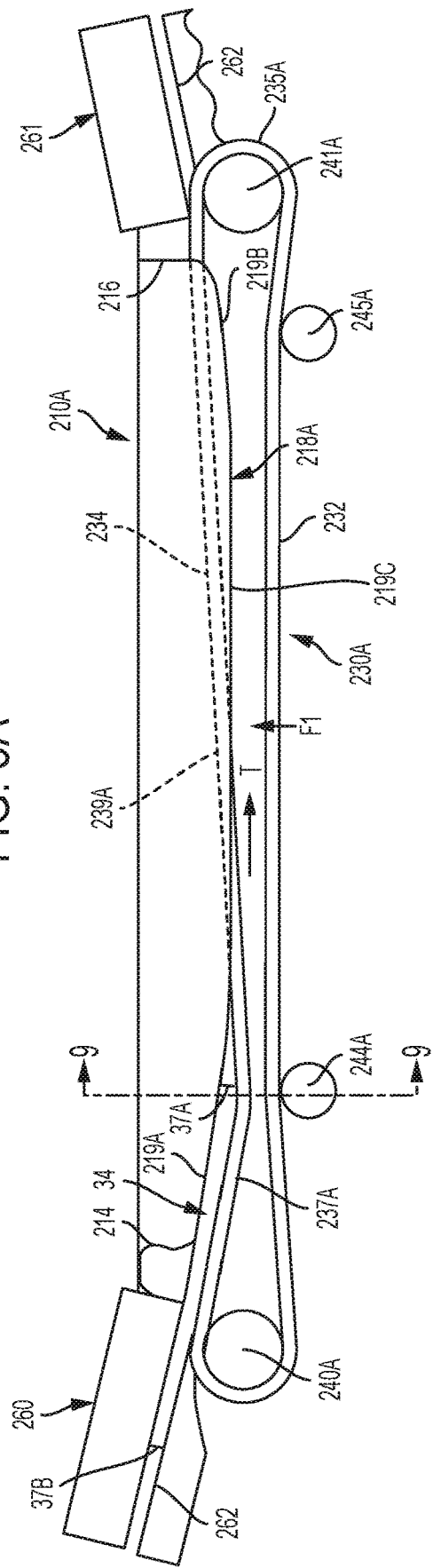
FIG. 5A
FIG. 5B

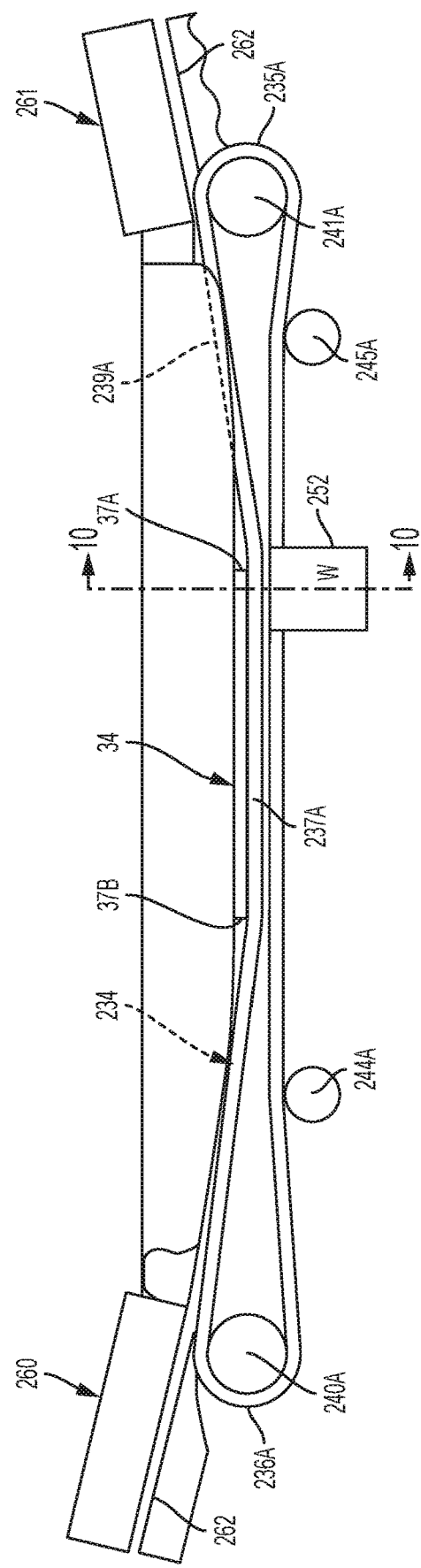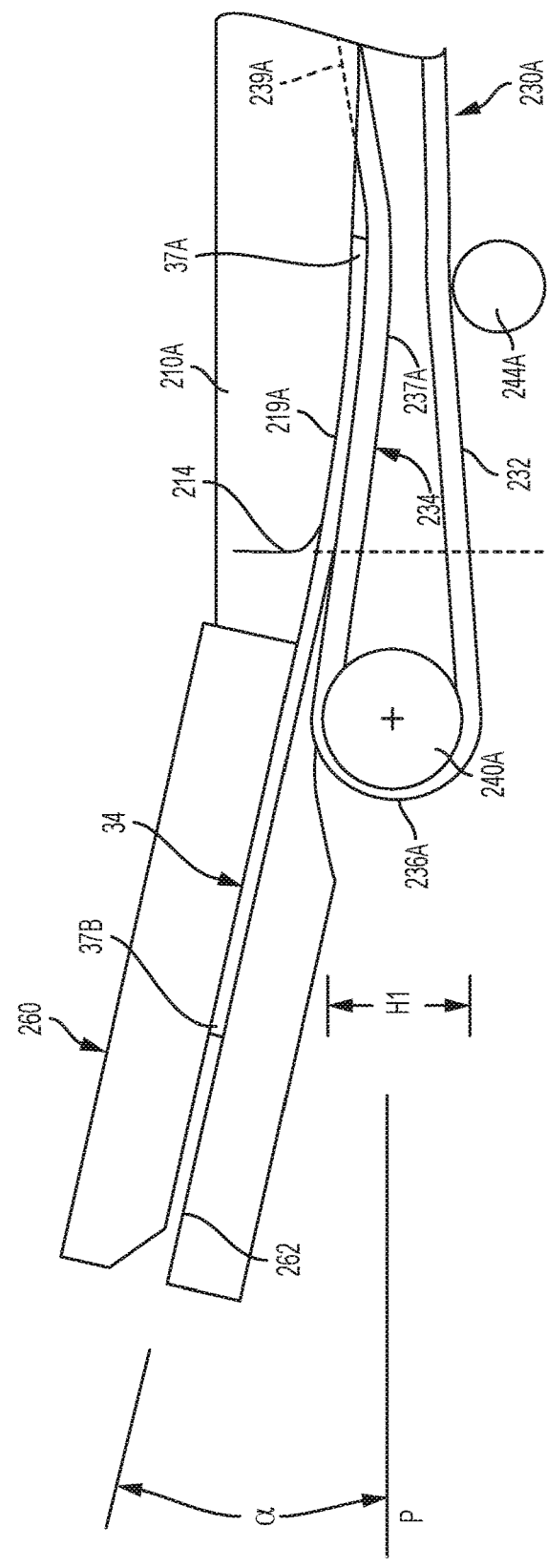

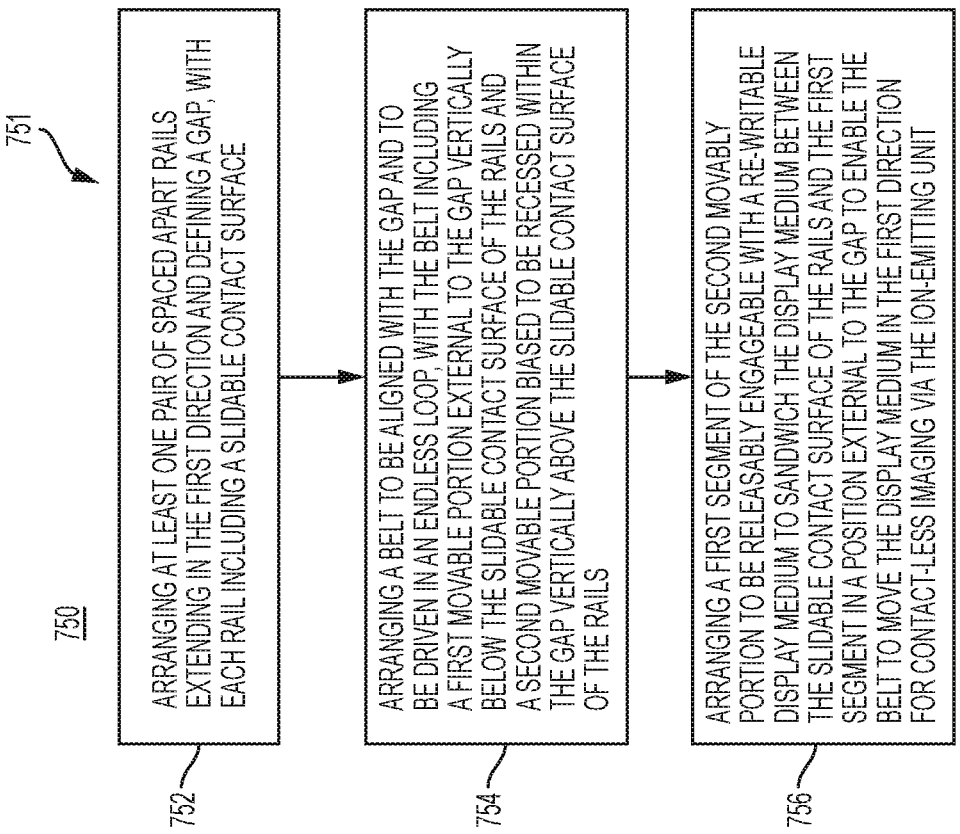
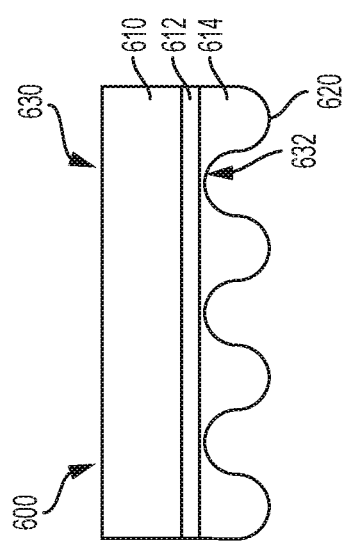
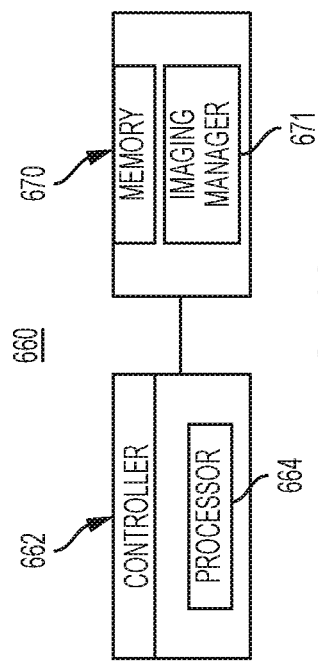
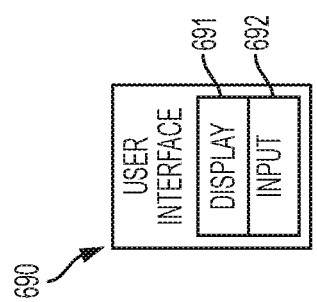

BELT DRIVE FOR REWRITABLE DISPLAY MEDIUM

BACKGROUND

In some instances, electronic ("e-paper") is described as a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 1 is a diagram schematically representing a device including a belt drive, according to one example of the present disclosure.

FIG. 2 is a block diagram schematically representing a control portion, according to one example of the present disclosure.

FIG. 3 is a top plan view schematically representing a passive e-paper display medium, according to one example of the present disclosure.

FIG. 4 is a sectional view schematically representing a passive e-paper display juxtaposed with an imaging unit, according to one example of the present disclosure.

FIG. 5A is a side plan view schematically representing a device including a belt drive, according to one example of the present disclosure.

FIG. 5B is a side plan view schematically representing the device of FIG. 5A upon insertion of a rewritable display medium, according to one example of the present disclosure.

FIG. 6 is a side plan view schematically representing the device of FIG. 5A in a state during imaging of the rewritable display medium, according to one example of the present disclosure.

FIG. 7 is an enlarged side plan view schematically representing a portion of the device of FIG. 5B, according to one example of the present disclosure.

FIG. 12 is a side sectional view schematically representing a portion of a belt, according to one example of the present disclosure.

FIG. 13 is a block diagram schematically representing a control portion, according to one example of the present disclosure.

FIG. 14 is a block diagram schematically representing a user interface, according to one example of the present disclosure.

FIG. 15 is a flow diagram schematically representing a method of manufacturing a device including a belt drive, according to one example of the present disclosure.

DETAILED DESCRIPTION

Figure 8:
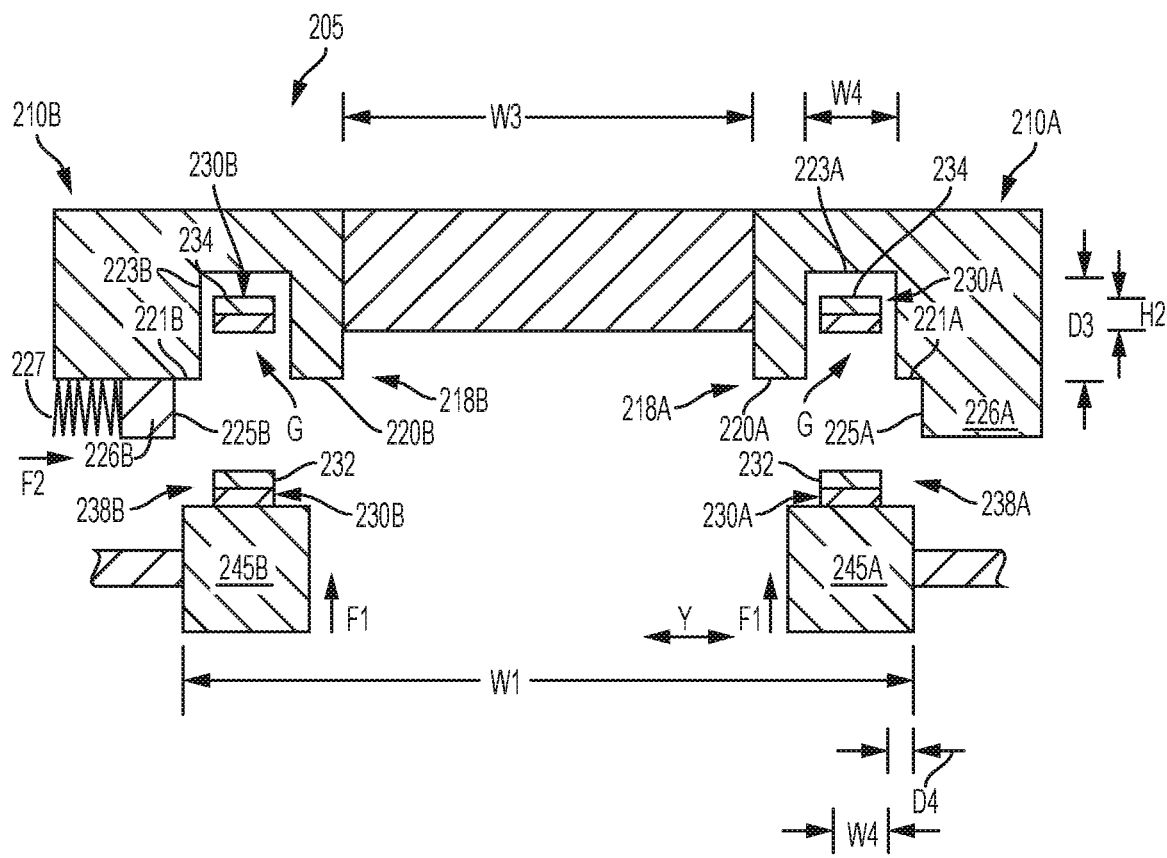
FIG. 8 is a sectional view of FIG. 5A taken along lines 8-8 and schematically representing the belt drive prior to engaging a rewritable display medium, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to a belt drive for a rewritable display medium. In some examples, a belt drive comprises at least one pair of spaced apart rails extending in a first direction and defining a gap. A belt is aligned with the gap and is to be driven in an endless loop, including a first movable portion external to the gap on a first side (e.g. vertically below) of the rails and a second movable portion biased to be recessed within the gap on an opposite second side (e.g. vertically above) of the rails. A rewritable display medium is releasably engageable in a sandwiched position between a slidable contact surface of the rails and a first segment of the second movable portion external to the gap to move the display medium in the first direction for contact-less imaging via a unit spaced from the rails.

In some examples, the belt drive includes a pair of spaced apart conveying structures, with each respective conveying structure comprising one pair of the spaced apart rails as described above. Accordingly, each conveying structure includes its own belt. In some examples, the conveying structures are spaced apart to be located on opposite sides of a rewritable portion of the display medium.

In some examples, the rewritable display medium includes a passive e-paper display, and the belt drive comprises part of an imaging device in which the unit comprises an ion-emitting unit to direct airborne ions onto the passive e-paper display. In some examples, the ion-emitting unit includes a writing portion and/or an erasing portion. In some examples, the writing portion is spaced apart from the erasing portion along a travel direction of the display medium.

In some examples, at least a portion of the slidable contact surface of the rails defines an arcuate surface. In some instances, the arcuate surface is located at an entrance portion of the belt drive and/or an exit portion of the belt drive, and facilitates releasable engagement of the display medium by the belt relative to the slidable contact surface. Moreover, in some examples, the entrance portion defines a path at an angle relative to at least a portion of the slidable contact surface to facilitate insertion of the display medium into releasable engagement relative to the belt.

Among other features, by aligning the belt between a pair of rails, wear on the belt and/or slidable contact surface of the rails may be greatly reduced, which in turn may prolong the useful life of the belt and/or slidable contact surface. Moreover, by using a belt to releasably engage the display medium, consistent gap control and/or consistent travel speed may be achieved during erasing and/or writing to the display medium. This, in turn, may enhance quality imaging on the rewritable display medium.

These examples, and additional examples, are described and illustrated below in association with at least FIGS. 1A-15.

FIG. 1 is diagram schematically representing an imaging device 20 including an imaging module 22 and a belt drive 30, according to one example of the present disclosure. In some examples, imaging module 22 is positioned to selectively perform imaging functions, such as erasing and/or writing, relative to a spaced apart rewritable display medium 28 supported via belt drive 30. In some examples, the imaging module 22 comprises an ion-emitting unit, as later described in association with at least FIG. 4. In some examples, belt drive 30 releasably receives and mounts display medium 28 to be spaced apart from the imaging module 22 by a distance D1, as shown in FIG. 1.

As shown in FIG. 1, display medium 28 includes a generally planar member having opposite surfaces 29A, 29B (e.g. faces). In some examples, one of the surfaces 29A, 29B of display medium 28 corresponds to an image-writing surface of the display medium 28 and one of those respective surfaces 29A, 29B corresponds to an image-viewing surface of the display medium 28. In some examples, the image-viewable surface (i.e. image-bearing surface) corresponds to the image-writing surface of the display medium 28 while in some examples, the image-viewable surface (i.e. image-bearing surface) corresponds to a non-image-writable surface of the display medium. Further details of these relationships are described later in association with at least FIGS. 3-4.

In some examples, imaging module 22 includes an erasing unit 26 to erase any prior image from the display medium 28. In some examples, imaging module 22 includes a writing unit 24 to write a new image on the display medium 28. In some examples, imaging module 22 includes both of the erasing unit 26 and the writing unit 24, which may or may not be embodied as a single element.

During operation of the erasing unit 26 and/or writing unit 24, relative movement occurs between the display medium 28 and the imaging module 22. In some examples, such relative movement is achieved via providing a stationary imaging module 22 while moving the display medium 28 via belt drive 30. Further examples of a display medium 28 and imaging module 22 are provided in association with at least FIG. 3-4 and further examples of a belt drive 30 are provided in association with FIGS. 5A-14.

FIG. 2 is a block diagram schematically representing a control portion 35, according to one example of the present disclosure. In some examples, control portion 35 comprises at least some of substantially the same features and attributes as control portion 660, as later described in association with at least FIG. 13. In some examples, control portion 35 forms part of, or operates in association with, control portion 660. In some examples, control portion 35 facilitates control over the sequence and timing of operations of imaging module 22, as well as facilitating control over a velocity (e.g. both speed and direction) of relative movement between belt drive 30 and imaging module 22.

FIG. 3 is a top plan view of a display medium 34 including a passive e-paper display 31, according to an example of the present disclosure. In some examples, display medium 34 comprises at least some of substantially the same features and attributes as display medium 28, as previously described in association with FIG. 1.

As further shown in FIG. 3, in some examples passive e-paper display 31 of display medium 34 bears an image 40 expressed across substantially the entire available viewing surface 29A. In some examples, image 40 includes portions 42 ("Retailer Brand Name"), 44 ("Product Name"), 46 ("Product Details"), and/or 48 (QR Code graphic). Accordingly, image 40 comprises text and/or graphics. It will be understood that in this context, in some examples, graphics also refers to an image, such as specific picture of a person, object, place, etc. Moreover, the particular content of the information in image 40 is not fixed, but is changeable by virtue of the rewritable nature of the e-paper display 31. In one example, a location, shape, size of portions 42, 44, 46, 48 of an image 40 is also not fixed, but is changeable by virtue of the rewritable nature of the e-paper display 31.

As shown in FIG. 3, in some examples, display medium 34 includes a support frame 33 secured to a portion of e-paper display 31. In some examples, frame 33 defines a generally rectangular member, as shown in FIG. 3, which generally matches the size and shape of the periphery of the e-paper display 31. In some examples, the frame 33 is generally co-extensive with an outer portion of the e-paper display 31. In some examples, frame 33 is omitted and e-paper display 31 is free-standing without frame 33. In some examples, frame 33 includes opposite side portions 32A, 32B and opposite end portions 32C, 32D. In some examples, the side portions 32A, 32B of frame 33 further define respective opposite side edges 35A, 35B while end portions 32D, 32C further define respective ends 37A, 37B.

In some examples, frame 33 is made from a polycarbonate or polyvinylchloride (PVC) material. However, in more general terms, frame 33 is made from a resilient or semi-rigid material that is generally non-conductive and that provides mechanical strength and toughness to the e-paper display 31 for protection from bending, compression, abrasion, etc.

In at least some examples of the present disclosure, in addition to the changeable content available via e-paper display 31, fixed content 51 may be located on the frame 33. In some examples, the fixed content 51 may include a logo, name or indicia. In some examples, the fixed content 51 may relate to a retailer or other entity associated with the content writable onto the e-paper display 33. In some examples, the fixed content 51 is imaged via inkjet printheads, digital press, etc. using inks, toners, etc. that would typically be used to print on paper, plastic.

In general terms, display medium 34 includes any visual medium of content consumption. In some examples, display medium 34 includes financial transaction media (e.g. gift cards, prepaid cards, insurance cards, credit cards, etc.) or information transaction media (e.g. shelf tags, boarding passes, shipping labels, package tracking in general. In some examples, display medium 34 includes media used to gain access, establish credentials, and/or implement security.

In at least some examples of the present disclosure, e-paper display 31 is passive in the sense that it is rewritable and holds an image without being connected to an active power source during the writing process and/or after the writing is completed. Accordingly, in some examples, e-paper display 31 omits an on-board power source. In some examples, the e-paper display 31 omits internal circuitry or internal electrode arrays that might otherwise be associated producing specific images in the e-paper display 31. Instead, in some examples, the passive e-paper display 31 relies on a charge-responsive layer that is imageable via an external writing module and that does not require a power supply to be imaged or to retain an image.

Instead, as further described later, the passive e-paper display 31 is imaged in a non-contact manner in which the e-paper display 31 receives charges (emitted by a ion head) that travel through the air and then form image 40 via a response by charged particles within a layer of the e-paper display 31. After the imaging process is completed, the passive e-paper display 31 retains the image generally indefinitely and without a power supply until image 40 is selectively changed at a later time.

In at least some examples, the passive e-paper display 31 operates consistent with electrophoretic principles. With this in mind, in at least some examples, passive e-paper display 31 includes a charge-responsive layer in which charged color particles switch color when charges are selectively applied a non-contact manner (e.g. airborne migration) by an external module spaced apart from the charge-responsive layer. In some examples, the charged color particles comprise pigment/dye components. In one aspect, this arrangement is implemented via microcapsules containing a dispersion of pigmented particles in a dielectric oil. In some examples, a resin/polymer forms a matrix material that retains the microcapsules in the charge-responsive layer.

In one example, the passive e-paper display 31 further includes a conductive layer which serves as a counter-electrode on one side of the e-paper display 31. In some examples, an additional functional coating is applied to an imaging side of the e-paper 31.

One implementation of an e-paper display 31 according to above-described examples of the present disclosure is later described and illustrated in association with at least FIG. 4.

FIG. 4 is a sectional view providing a schematic representation of an e-paper display 131 and an associated e-paper writing system 100, according to one example of the present disclosure. In some examples, this e-paper display 131 is implemented via a display medium having at least some of substantially the same features and attributes as display medium 28, 34 previously described in association with at least FIGS. 1 and 3, and in subsequent examples described in association with at least FIGS. 5A-14. In some examples, display medium 131 comprises an e-paper structure 101 as shown in FIG. 4.

Meanwhile, writing system 100 includes an imaging module 102 and is provided in FIG. 4 to generally illustrate a response of the e-paper structure 101 (of e-paper display media 131) to an erasing unit 106 and/or writing unit 104. In some examples, imaging module 102 comprises at least some of substantially the same features and attributes as imaging module 22 in FIG. 1.

As shown in FIG. 4, imaging module 102 includes writing unit 104 and erasing unit 106. In some examples, the erasing unit 106 is implemented via an ion-emitting element separate from, and independent of, a different ion-emitting element which implements the writing unit 104. In some examples, the writing unit 104 and erasing unit 106 are implemented via the same ion-emitting element, and by which a polarity of the ions-to-be-emitted can be selectively switched between positive and negative. In some examples, one or both of the writing unit 104 and erasing unit 106 comprises a corona-based charge ejecting device.

In some examples, instead of employing an ion-based emitting unit, erasing unit 106 is implemented via an electrode that comes into close contact with, rolls across, or that is dragged along, the surface 108 in front of a separate writing unit 104.

In some examples, e-paper structure 101 has an imaging surface 29A and an opposite non-imaging surface 29B, as in FIGS. 1 and 3.

In general terms, e-paper structure 101 includes a protective layer 108, a charge-responsive layer 109, and a base 110. The protective layer 108 is sometimes referred to as charge-receiving layer 108. The base 110 defines or includes a counter electrode, as further described below, which serves as a ground plane.

In the example shown in FIG. 4, the charge-responsive layer 109 includes a plurality of microcapsules 105 disposed within a matrix material 130 and with each microcapsule 105 encapsulating some charged black particles 124 and some charged white particles 120 dispersed within a dielectric liquid, such as an oil. In one example, as shown in at least FIG. 4, the black particles 124 are positively charged and the white particles 120 are negatively charged.

In some examples, microparticles 120 have a color other than white and microparticles 124 have a color other than black, provided that microparticles 120 have a color different than microparticles 124. In some examples, the color of the particles is originated from pigments, while in some examples the color originates from a dye.

In some examples, charge-responsive layer 109 is formed with microcapsules 105 containing just charged particles 120 (and not containing any charged particles 124) suspended within the microcapsules 105 with an electrically neutral dye having a color different than the color of the particles 120 (e.g. white in one example). In some examples, the liquid solution is dielectric. In some instances, such dielectric solutions include isoparaffinic fluids, such as an Isopar® fluid. Likewise, in some examples, charge-responsive layer 109 is formed with microcapsules 105 containing just charged particles 124 (and not containing any charged particles 120) suspended within the microcapsules 105 with an electrically neutral dye having a color different than the color of the particles 124 (e.g. black in one example).

Via the erasing unit 106, any information stored via the microcapsules 105 is removed prior to writing information via writing unit 104. In the example shown in FIG. 4, as the e-paper structure 101 passes under the imaging module 102, the erasing unit 106 emits positive ions 107, which act to remove negative ions that are attached to the surface 108. The positive charge erasing unit 106 also creates electrostatic forces, which drive positively charged black particles 124 away from the charge receiving layer 108 and which attract negatively charged white particles 120 toward the charge receiving layer 108. By passing the erasing unit 106 over the charge receiving layer 108, the information written to the e-paper structure 101 is erased by positioning the negatively charged white particles 120 near the top of the microcapsules 105 and pushing the positively charged black particles 124 to the bottom of the microcapsules 105.

During writing, electrical contact is made by a ground resource with exposed portions of base 110 (including a counter electrode) to allow biasing of the writing unit 104 while it applies charges to charge receiving layer 108 during the writing process.

Microcapsules 105 exhibit image stability via chemical adhesion between microparticles and/or between the particles and the microcapsule surface. For example, microcapsules 105 can hold text, graphics, and images indefinitely without using electricity, while allowing the text, graphics, or images to be changed later.

The structure, materials, and dimensions of the various layers and components of e-paper structure 101 are chosen for specific design criteria. In one example, the transparent charge receiving layer 108 is composed of a transparent polymer and can have a thickness between 50 μm and 250 μm. In some examples, the transparent charge receiving layer 108 is also composed of a material that holds charges or is porous or semi-porous to charges and/or ions.

In some examples, the diameter of each microcapsule 105 is substantially constant within charge-responsive layer 109 of e-paper structure 101 and, in some examples, the thickness of charge-responsive layer 109 is between about 20 μm and about 100 μm, such as 50 μm. In some examples, base 110 has a thickness between about 20 μm and about 1 mm, or larger depending on how e-paper display 131 is to be used. In some examples, the protective or charge-receiving layer 108 is about 5 microns thick.

In one aspect, base 110 is structured to provide enough conductivity to enable counter charges to flow during printing. As such, in general terms, base 110 comprises a member including at least some conductive properties. In some examples, base 110 comprises a non-conductive material that is impregnated with conductive additive materials, such as carbon nanofibers or other conductive elements. In some examples, base 110 comprises a conductive polymer, such as a urethane material or a carbonite material. In further examples, base 110 is made from a conductive polymer with carbon nanofibers, to provide flexibility with adequate strength.

In some examples, base 110 is primarily comprised of a conductive material, such as an aluminum material and therefore is impregnated or coated with additional conductive materials.

In some examples, whether conductivity is provided via coating, impregnation or other mechanisms, the body of base 110 is formed from a generally electrically insulative, biaxially-oriented polyethylene terephthalate (BOPET), commonly sold under the trade name MYLAR, to provide flexibility and strength in a relatively thin layer.

In some examples, the base 110 is opaque or is transparent, depending on the particular implementation of the e-paper display 131. With further reference to FIG. 4, in some examples, base 110 is opaque, such that image-writing surface 29A of e-paper display 31 also serves as an image-viewing surface, as represented via eye icon 52 and reference V1 in FIG. 4. However, in some examples, base 110 is provided as a transparent element, such that the bottom surface 29B of e-paper display 31 serves as an image-viewing surface of the e-paper display 131 as represented via eye icon 52 and reference V2 in FIG. 4. In some examples, in this latter arrangement, layer 125 is opaque.

In some examples, the base 110 comprises a generally resilient material, exhibiting flexibility and in some implementations, semi-rigid behavior. In some examples, the base 110 comprises a rigid material.

In some examples, the protective, charge receiving layer 108 is made from a semi-conductive polymer having a resistivity of about $10^9$ Ohm-cm or a porous layer that enables ion charges to pass through the layer 108 during erasing and/or writing cycles.

FIG. 4 also shows one example writing operation performed by the writing unit 104 in which the deposition of charges influences the distribution of charged pigments/particles within affected microcapsules 105. In one aspect, the writing unit 104 is designed and operated to selectively eject electrons 114, shown as black bars, toward the charge receiving surface 108, when a region of the e-paper structure 101 located beneath the writing unit 104. As the electrons 114 reach the surface 108, the negatively charged white particles 120 are repelled and driven away from the charge receiving surface 108, while the positively charged black particles 124 are attracted to the negatively charged electrons/ions 114 and driven toward the charge receiving surface 108. Areas of charge-receiving layer 108 will retain a positive charge, and therefore a white appearance in this example. Furthermore, as the writing unit 104 passes over microcapsules 105 while ejecting electrons, the negatively charged white particles 120 are repelled away from the insulating layer and the positively charged black particles 124 are driven toward the charge receiving layer 108.

It will be understood that, in general, charges emitted onto the charge receiving layer 108 are retained for a brief period of time just long enough for the microparticles 120, 124 to switch in response to the received charges at layer 108. In one aspect, many of the charges at layer 108 recombine with the opposite charges carried by the arriving microparticles 120 or 124 (depending on which charges were received), with excess charges dissipating generally through the e-paper structure 101, such as but not limited to, migrating downward between the capsules 105.

With this in mind, it will be further understood that any charges deposited onto charge receiving layer 108 will dissipate over time. Accordingly, in just one example, the charges 116 shown in FIG. 4 at charge receiving layer 108 will dissipate over time and do not represent a long term situation.

The e-paper writing system 100, as shown in FIG. 4, is not limited to implementations in which the writing unit 104 discharges electrons and the erasing unit 106 erases information with positive charges. Instead, in some examples, the microcapsules 105 in matrix material 130 of the charge-responsive layer 109 of e-paper structure 101 are composed of negatively charged black particles 124 and positively charged white particles 120. In such examples, the writing unit 104 is designed to produce positive ions for forming a new image, while the erasing unit 106 uses negative charges to erase prior imagery from passive e-paper display 131.

In some examples, charge receiving layer 108 comprises a protective element or coating, which protects the charge-responsive layer 109 (including microcapsules 105) from mechanical damage, pressure and impact, and from collecting tribo charges. It also is designed to reduce increases in dot size due to field screening during charging (the "blooming effect"). In one implementation, the protective charge-receiving layer 108 includes semiconducting characteristics which allow for a controlled decay of the latent charge image, such that the layer 108 gradually dissipates the charges to the ground defined by base 110. The resistivity of the layer 108 is designed to enable fast movement of charges through layer 108. In some instances, the charges will be transferred to ground at least partially defined by base 110 through the layer 109. In particular, the matrix material 131 of charge-responsive layer 109 is selected to provide the desired optical and mechanical characteristics, as well as the desired electrical resistivity.

FIG. 5A is a side plan view schematically representing a device 200 including a belt drive 205, according to one example of the present disclosure. In some examples, belt drive 205 includes at least some of substantially the same features and attributes as belt drive 30 in FIG. 1. As shown in FIG. 5A, in some examples belt drive 205 includes at least one conveying structure 210A having a slidable contact surface 218A and a driven belt 230A. The conveying structure 210A includes a body 212 and opposite end portions 214, 216 between which the slidable contact surface 218A extends.

A first portion 232 of belt 230A is spaced apart from, and extends vertically below the slidable contact surface 218A of the conveying structure 210A. Among other features, the conveying structure 210A defines a gap G to receive a second portion (represented via dashed lines 234) of the belt 230A, which is biased to be recessed within the gap G.

While gap G is not shown in FIG. 5A, it is later described and illustrated in association with at least FIGS. 8-10. In addition, as later described in association with FIGS. 8-10, conveying structure 210A defines a pair of rails 220A, 221A between which the gap G extends.

In at least some examples, belt 230A defines an endless loop that is driven to move cyclically about drive elements 240A, 241A at least while conveying a display medium 34. Accordingly, it will be understood that the term "first portion" (or first movable portion) 232 refers to an arrangement in which the moving belt 230A always has at least some segments of the belt 230A in a position spaced apart from and vertically below the slidable contact surface 218A, even though the particular segments of the belt 230A in this position change over time. Similarly, the term "second portion" (or second movable portion) 234 refers to the arrangement in which the moving belt 230A always has at least some segments of the belt 230A in a position spaced apart from and vertically above the slidable contact surface 218A, even though the particular segments of the belt 230A in this position change over time.

In some examples, belt drive 205 includes drive elements 240A, 241A with belt 230A defining an endless loop extending about drive elements 240A and 241A, which are located beyond opposite ends 214, 216 of conveying structure 210A. Accordingly, in some examples, the first movable portion 232 and second movable portion 234 do not exclusively define the endless loop comprising belt 230A. Rather, in some instances, belt 230A is further defined as including a third movable portion 236A of belt 230A extending about drive roller 240A and a fourth movable portion 235A of belt 230A extending about drive roller 241A. In this arrangement, third movable portion 236A is interposed between first movable portion 232 and second movable portion 234 while fourth movable portion 235A is interposed between first movable portion 232 and second movable portion 234.

In some examples, each drive element 240A, 241A is located longitudinally beyond (e.g. longitudinally external to) the respective first and second end portions 214, 216 of conveying structure 230A. As later detailed in association with at least FIG. 5B, in some examples this arrangement places the driving element 240A longitudinally beyond (e.g. external to) an entry point of a first end 37A of a display medium (e.g. 34 in FIG. 3) relative to conveying structure 210A and relative to a point at which the belt 230A makes releasable contact with the first end 37A of display medium 34.

While each drive element 240A, 241A can take a variety of forms, in some examples at least one of the drive elements 240A, 241A comprises a drive roller, as shown in FIG. 5A. For instance, drive roller can include a drive surface, such as a high-friction surface, teeth, and/or other surface elements to engage corresponding elements and/or surfaces on belt 230A.

In some examples, the drive elements 240A, 241A are positioned to, and have a height H1 as shown in FIG. 7 (e.g. a diameter) to, cause the first movable portion 232 of belt 230A to be positioned vertically below slidable contact surface 218A of conveying structure 210A and the second movable portion 234 to be biased in a position vertically above slidable contact surface 218A of conveying structure 210A.

In some examples, belt drive 205 includes idler rollers 244A. 245A, which are positioned below first portion 232 of belt 230A, and positioned internally relative to drive elements 240A, 241A. The idler rollers 244A, 245A are positioned to exert an upward pressure (as represented by directional force arrows F1) on second portion 234 of belt 230A. In one aspect, a position of the idler rollers 244A, 245A is adjustable laterally (as represented via directional arrow x) and adjustable vertically (as represented via directional arrow y) in order to define a desired path for the belt 232 to enabe placing components such as an ion-emitting close to the guide surface 218A. As noted later, in some examples, such an ion-emitting unit may include an erasing unit 250 and/or a writing unit 252.

The belts are kept in tension via allowing one of the drive elements 240A or 241A to be spring loaded in an opposite direction from the other respective drive element, thereby creating a preload on the belt 230, which in turn controls the reliability of the drive for the display medium 34.

In some examples, device 200 includes an entrance portion 260 located adjacent first end portion 214 of conveying structure 210A. In general terms, entrance portion 260 acts to slidably receive and guide a display medium 34 (in FIG. 3) to become releasably engaged by belt 230A of belt drive 205.

In some examples, the display medium 34 can take other physical forms than previously described in association with FIG. 3 and/or can embody rewritable technologies other than the passive e-paper display 31, 131 as previously described in association with in at least FIGS. 3-4.

In some examples, entrance portion 260 includes an entry path 262 to slidably receive and guide the display medium 34 toward the belt drive 205 until a first end 37A of the display medium 34 makes contact with the belt 230A. In some examples, the entry path 262 has a length (L2) less than a length (L1 in FIG. 3) of the display medium 34 such that a user holding end 37B of display medium 34 can push display medium 34 into and along path 262 until opposite end 37A (e.g. the inserted end) of the display medium 34 is engaged by the belt 230A. In some examples, entry path 262 of entrance portion 260 has a length L2 at least one-half the length L1 of display medium 34.

In some examples, device 200 comprises at least one ion-emitting unit to direct ions in an airborne manner onto display medium 34. In some examples, such an ion-emitting unit comprises an erasing unit 250 and/or a writing unit 252. In some examples, erasing unit 250 and writing unit 252 comprise at least some of substantially the same features and attributes as erasing unit (26, 106) and writing units (24, 104), as previously described in association with at least FIGS. 1 and 4. In some examples, writing unit 252 is spaced apart in the first direction from the erasing unit 250 by a distance D2. This distance D2 is selected to enable enough time, given a particular travel velocity of moving belt 230A, for the rewritable portion (e.g. passive e-paper display 31, 131) of display medium 34 to respond to erasing operations on any prior images to be completed prior to a new image being written to the rewritable portion of display medium 34 via writing unit 252.

In some examples, slidable contact surface 218A of conveying structure 210A includes first end contact portion 219A and an opposite second end contact portion 219B with first end contact portion 219A including an arcuate shape to enable insertion of first end 203A of display medium 34 between the second movable portion 234 of belt 230A and the slidable contact surface 218A of the conveying structure 210A, as shown in FIGS. 5A-5B.

For instance, as shown in FIG. 5B, upon slidable insertion of the display medium 34 at entrance portion 260, first end 37A of the display medium 34 engages a first segment 237A of the second portion 234 of the belt 230A, which acts to force at least the first segment 237A of the second portion 234 vertically below slidable contact surface 218A overcoming biasing force (represented via directional arrow F1) enough for the display medium 34 to become sandwiched between (and releasably constrained) the first segment 237A of belt 230A and the slidable contact surface 218A of conveying structure 210A. With the belt 230 maintaining the upward vertical force against the display medium 34 to constrain display medium 34 against slidable contact surface 218A, the movement of belt 230A in the first direction (directional arrow X) conveys display medium 34 along the travel path (directional arrow T).

In one aspect, it will be understood that any segment of movable belt 230A can potentially correspond to the first segment 237A, which releasably engages the display medium 34. Moreover, once the first segment 237A releasably engages the display medium 34, then that particular segment stays "fixed" to display medium 34 until the display medium 34 exits the belt drive 205.

With further reference to FIGS. 5A-6, in some examples, the first contact end portion 219A of slidable contact surface 218A has a first radius of curvature and the second contact end portion 219B of slidable contact surface 218A has a second radius of curvature. In some examples, the first and second radius of curvatures are substantially the same.

In some examples, a middle contact portion 219C of the slidable contact surface 218A is generally arcuate such that substantially entire slidable contact surface 218A is curved. However, in some examples, the middle contact portion 219C is generally planar.

As belt 230A acts to move display medium 202 toward the opposite end portion 216 of conveying structure 210A, display medium 34 will pass by erasing unit 250 and writing unit 252 (FIG. 5A, 6). Accordingly, FIG. 6 is a side plan view schematically representing the device of FIG. 5A in a state during imaging of the rewritable display medium, according to one example of the present disclosure.

As shown in FIG. 6, segment 239A of the second movable portion 234 other than first segment 237A is biased to be recessed within the gap G, and extend vertically above the slidable contact surface 218A. In other words, as first segment 237A of second movable portion 234 proceeds along a length of slidable contact surface 218A to convey display medium 34 toward the second end 216 of conveying structure 210A, segment 239A is biased into the recessed position.

In some examples, a combination of the substantially uniform first segment 237A and the substantially uniform slidable contact surface 218A helps to maintain the display medium 34 in a generally deflection-free state at least while being imaged via writing unit 252 and/or erasing unit 250. In some examples, this generally deflection-free state of display medium 34 is generally maintained substantially the entire time that display medium 34 is in contact with slidable contact surface 218A and first segment 237A of belt 230A.

Moreover, in some examples the generally deflection-free state of the display medium 34 facilitates establishing generally continuous gap control between the writing unit 252 (and/or erasing unit 250) and the display medium 34, thereby facilitating quality imaging by maintaining a generally fixed distance therebetween.

In some examples, quality imaging is further implemented via a generally continuous speed control of the display medium 34 during writing and/or erasing because the first segment 237A of belt 230A maintains constant contact with substantially an entire length (L1) of display medium 34.

In one aspect, this arrangement stands in sharp contrast to existent conveying arrangements in which several rollers are arranged in a travel direction (directional arrow T), such that variations in travel speed occur due to the different, spaced apart rollers. In addition, such arrangements of different rollers also may cause deflections in portions of a display medium due to the spacing between the contact surface of adjacent rollers. In another aspect, by providing the slidable contact surface 218A as a generally singular component in the longitudinal direction (e.g. travel direction) and/or by providing the belt 230A in the form of an endless loop, a low part count can be implemented, which in turn may reduce noise that might otherwise be associated with other systems, such as roller-based systems which may have a relatively higher part count.

In addition, the generally continuous slidable contact surface 218A and generally uniform surface provided via first segment 237A of belt 230A may minimize chances for a misfeed or jam of display medium 34 in belt drive, at least as compared to existing drive systems which employ multiple rollers (instead of belt 230A) to move a display medium and which may be more prone to misfeeds and/or jams.

In some examples, at least one portion of slidable contact surface 218A at which erasing action and/or writing action occurs relative to display medium 34 defines a singular planar region, and the first segment 237A at least temporarily is generally parallel to the singular planar region. In one aspect, this arrangement ensures consistent control of the spacing between the rewritable portion (e.g. e-paper display 31 in FIG. 3, 131 in FIG. 4) of display medium 34 and the writing unit 252 (or erasing unit 250), which in turn may increase image clarity.

In some examples, as further shown in the enlarged partial side view of FIG. 7, entry path 262A of entrance portion 260 forms an acute angle α relative to a plane P through which at least a middle portion 219C of the slidable contact surface 218A extends. In some examples, the acute angle α is between about 0 to about 40 degrees. In some examples, the acute angle α is between about 10 to 30 degrees. In one aspect, this arrangement provides for a generally smooth entry angle of display medium 34 onto the curved first end contact portion 219A of slidable contact surface 218A, which may minimize or eliminate deflections of the display medium 34 along a length L1 of the display medium 34.

To further understand the interaction of belt 230A relative to slidable contact surface 218A, FIG. 8 provides a sectional view of FIG. 5A as taken along lines 8-8 and schematically represents the belt drive 205 prior to engaging a rewritable display medium 34, according to one example of the present disclosure.

As shown in FIG. 8, in some examples belt drive 205 further comprises a pair of conveying structures 210A, 210B with the conveying structure 210A shown in FIG. 5A being representative of conveying structure 210B. It will be understood that in some examples, the belt drive 205 in FIGS. 5A-6 incorporates a pair of conveying structures 210A, 210B as shown in at least FIGS. 8 and 9-10 with FIGS. 5A-6 including just one such conveying structure 210A for illustrative clarity.

As shown in FIG. 8, each respective slidable contact surface (218A, 218B) for each respective belt (230A, 230B) is at least partially defined by a respective inner rail (220A, 220B) and a respective outer rail (221A, 221B) of respective conveying structures 210A, 210B. For each conveying structure (210A, 210B), the gap G (previously noted in association with FIG. 5A) is defined between the inner rail 220A and outer rail 221A of slidable contact surface 218A and between the inner rail 220B and outer portion 221B of slidable contact surface 218B. In addition, each gap G forms part of a respective slot 223A, 223B in each respective pair of rails (e.g. pair 220A, 221A and pair 220B, 221B) and in which a second portion 234 of each belt 230A, 230B is recessed. The first pair of rails 220A, 221A and the second pair of rails 220B, 221B are generally parallel to each other and spaced apart by a distance W3.

As shown in FIG. 8, with this arrangement, second portion 234 of belt 230A, 230B is spaced apart from and vertically above slidable contact surfaces 218A, 218B. Moreover, in some examples, each recess 223A, 223B has a depth D3 such that second portion 234 of each belt 230A, 230B also does not generally make contact against a surface of each conveying structure 210A, 210B, such that unnecessary wear of belt 230A, 230B may be reduced. In some examples, each belt 230A, 230B has a height H2, which is less than the depth D3 of recess 223A, 223B, respectively.

As shown in FIG. 8, per its alignment between each pair of rails (e.g. pair 220A, 221A and pair 220B, 221B), each belt 230A, 230B does not engage or come into contact with the slidable contact surface 218B, 218B of the respective pairs of rails. In one aspect, other than their selective engagement against a display medium 34, each slidable contact surface 218A, 218B is free from contact with any other structures of belt drive 205. Accordingly, the slidable contact surfaces 218A, 218B do not experience unnecessary wear as might otherwise occur if each belts 230A, 230B made contact with surfaces 218A, 218B, such as in the absence of a display medium 34 being engaged by the belt drive 205.

As further shown in FIG. 8, each conveying structure 210A, 210B includes a guide 226A, 226B having a surface 225A, 225B positioned laterally external to each respective outer rail 220B, 221B to slidably contact and constrain side edges 35A, 35B of display medium 34 and to maintain a position of display medium 34 in second direction (represented by arrow y) transverse to the first direction. In some examples, both guides 226A, 226B are in a fixed position. However, in some examples, as shown in FIGS. 8-10, guide 226A is in a fixed position, while guide 226B is movable and biased to urge surface 225B laterally inward and in a direction toward guide 226A, as represented via directional force arrow F2. With this arrangement, as later shown in FIG. 10, the guides 226A, 226B releasably constrain a display medium 34.

In some examples, as further shown in FIG. 8, guide 226B is biased for inward lateral movement via a biasing element 227, such as a spring or similar component.

In some examples, guide 226B can be formed as a series of rollers aligned in the direction of travel path T (FIGS. 5-7), and extending at least a portion of a length of rails 220A, 221A or 220B, 221B. In this arrangement, corresponding biasing element(s) 227 urge the rollers laterally inward to releasably constrain a display medium 34, as described above.

In some examples, guides 226A, 226B are both elongate elements extending generally parallel to each rail 218A, 218B. In some examples, a length of elongate guide 226A, 226B is substantially same as a length of the respective rails 220A, 221A or 220B, 221B. In some examples, at least one guides 226A or 226B forms a monolithic structure with its corresponding pair of rails 220A, 221A or 220B, 221B, respectively. In some examples, at least one of the guides 226A, 226B is separate from, and independent of, each pair of rails (e.g. pair 220A, 221A or pair 220B, 221B) but is positioned in close proximity to those respective rails.

In one aspect, the previously noted idler rollers 245A, 245B are positioned below belt 230A, 230B to exert a biasing force (F1) against the first portion 232 of respective belts 230A, 230B to define a geometrical path on the respective belts 230A, 230B, as previously described herein. The belt tension controlled by the spring loaded driving element (240A and/or 241A) biases second portion 234 of belts 230A, 230B into recess 223A, 223B until a display medium 34 is engaged, as in FIG. 9, at which time, the tension urges first segment 237A of belt 230A against display medium 34. Upon display medium 34 exiting via exit portion 261 of device 200, then the biasing force (e.g. tension) on belt 230A, 230B causes the first segment 237A of second portion 234 to return to its recessed position as shown in FIG. 8.

With the general arrangement shown in FIG. 8 in mind, further details are provided regarding the releasable engagement of display medium 34 by belt 230A, 230B as previously described in association with at least FIG. 5B. In particular, FIG. 9 is a sectional view as taken along lines 9-9 of FIG. 5B, and which further depicts the releasable engagement of display medium 34 by belt drive 205, according to one example of the present disclosure. In particular, as shown in FIG. 9, a first end 37A of display medium 34 is sandwiched between first segment 237A of second portion 234 of belt 230A and slidable contact surface 218A and also between first segment 237B of second portion 234 of belt 230B and slidable contact surface 218B. In this arrangement, the first segments 237A, 237B of belts 230A, 230B are spaced apart from and vertically below slidable contact surfaces 218A, 218B, respectively. Moreover, in some examples, the side edges 35A, 35B of display medium 34 are laterally, slidably constrained by the guide surfaces 225A, 225B and/or slidably, rollably constrained in the case of guide 226B comprising roller(s).

In some examples, each belt 230A, 230B is positioned such that an outer lateral edge 238A, 238B of each belt 230A, 230B is spaced apart laterally by distance D4 from the side edges 35A, 35B of the display medium 34 as shown in at least FIG. 8. In some examples, this arrangement employed so that the belts 230A, 230B do not interfere with any exposed edge on display medium 34.

Figure 9:
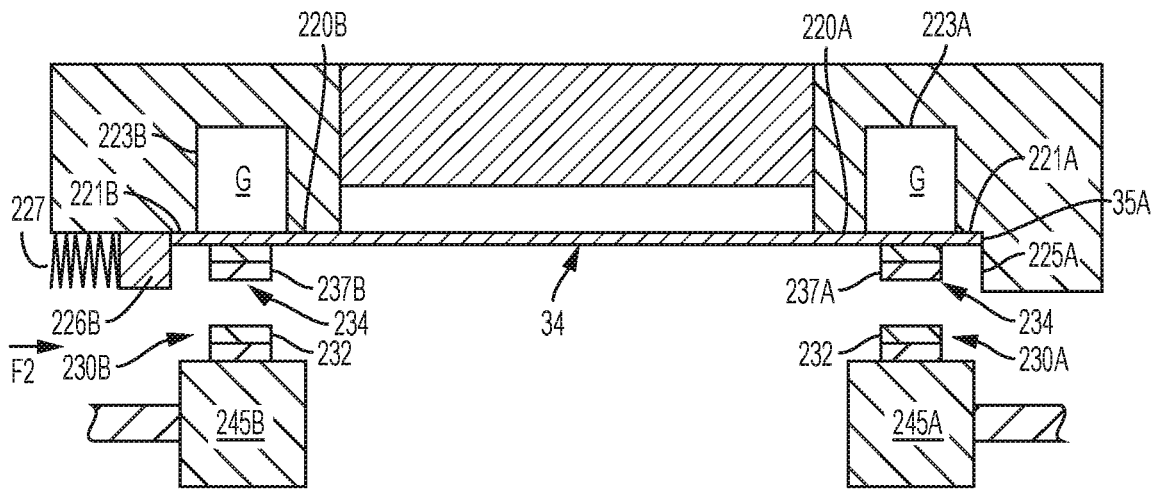
FIG. 9 is a sectional view of FIG. 5B taken along lines 9-9 and schematically representing the belt drive upon engaging a rewritable display medium, according to one example of the present disclosure.
Figure 10:
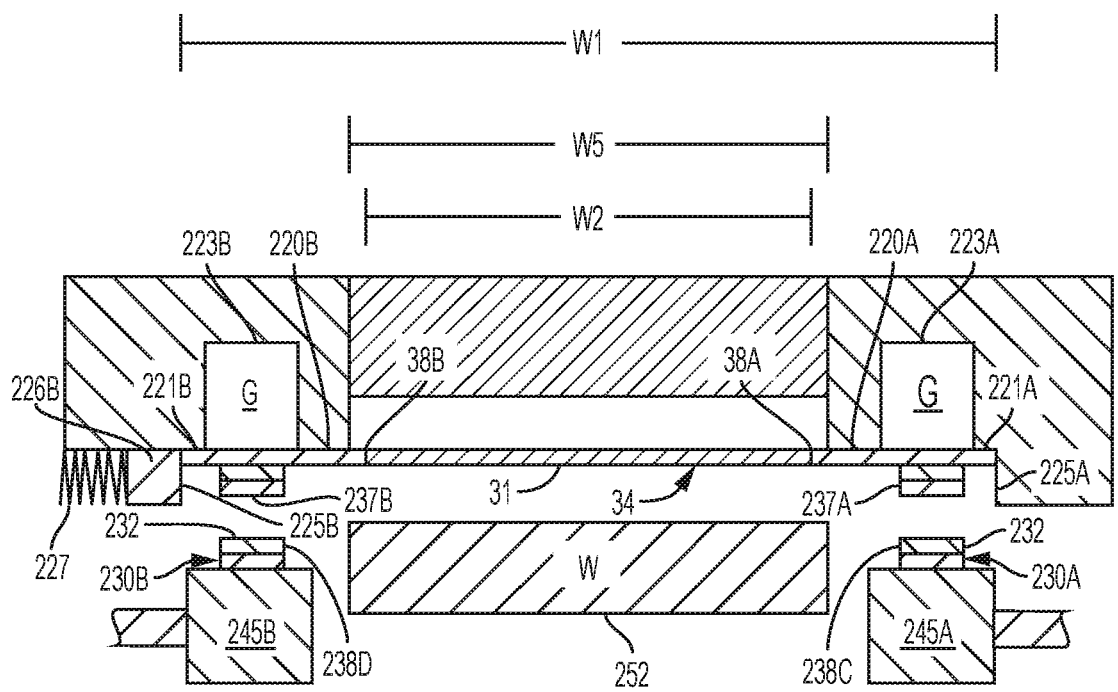
FIG. 10 is a sectional view of FIG. 6 taken along lines 10-10 and schematically representing the belt drive upon engaging a rewritable display medium, according to one example of the present disclosure.

However, while not shown in FIGS. 9-10, in some examples, an outer lateral edge 238A, 238B of each belt 230A, 230B coincides with or overlaps an outer edge 35A, 35B of display medium 34. In some examples, an inner edge 238C, 238D of each belt 230A, 230B is located laterally external to an outer edge 38A, 38B of the rewritable portion (e.g. e-paper display 31, 131) of the display medium, as further shown in FIG. 10.

In some examples, a width (W4) of each belt 230A, 230B is less than 5 percent of a width (W1) of the entire display medium 34, as shown in at least FIGS. 8 and 10.

FIG. 10 is a sectional view of FIG. 6 taken along lines 10-10 and schematically represents the belt drive 205 while fully engaging a rewritable display medium 34, according to one example of the present disclosure. The arrangement in FIG. 10 is substantially similar to that shown in FIG. 9, except further illustrating positional and dimensional relationships between the display medium 34 and various aspects of the belt drive 205. For instance, the respective conveying structures 210A, 210B are spaced apart from each other by a distance W5. In some examples, this distance W5 is greater than a width W2 of a passive e-paper display 31 of the display medium 34. In one aspect, this arrangement may ensure that the conveying structures 210A, 210B do not mechanically and/or electrically interfere with the e-paper display 31.

FIG. 10 also further illustrates the manner by which the conveying structures 210A, 210B align display medium 34 to receive ions from spaced apart writing unit 252.

Figure 11:
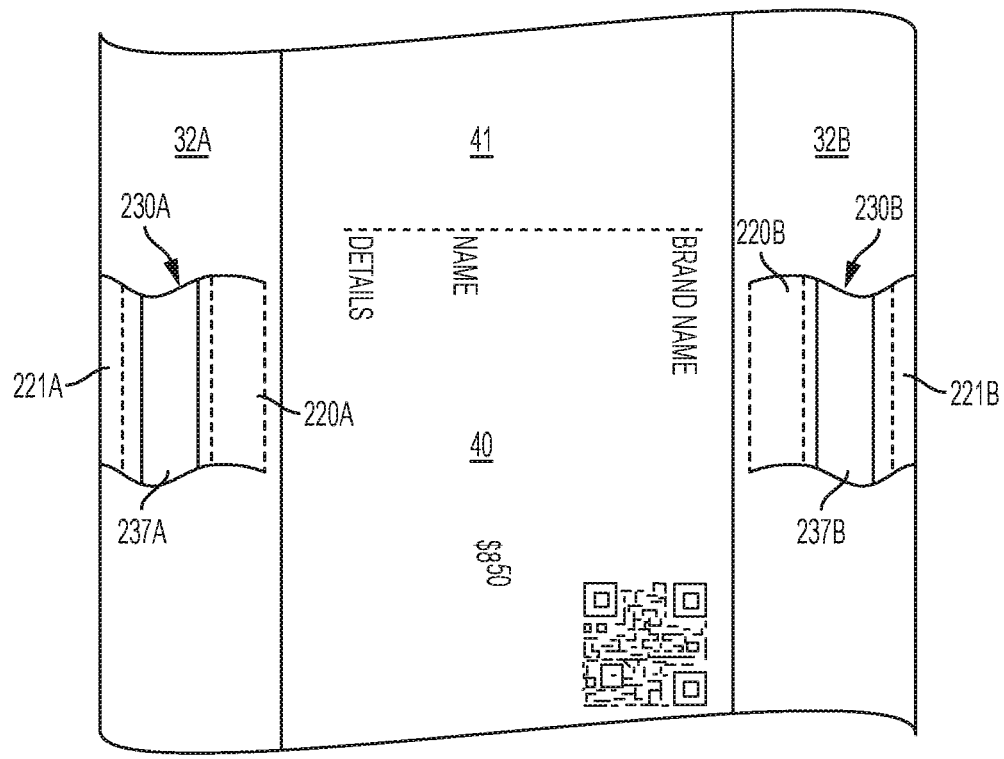
FIG. 11 is a plan view schematically representing a portion of the belt drive juxtaposed relative to the rewritable display medium during imaging, according to one example of the present disclosure.

FIG. 11 is a top plan view schematically representing portions of a belt drive 205 juxtaposed relative to the rewritable display medium 34 during imaging, according to one example of the present disclosure. As shown in FIG. 11, spaced apart belts 230A, 230B are positioned to coincide with opposite side portions 32A, 32B of frame 33 of display medium 34 (FIG. 3), such that the belts 230A, 230B are laterally external to the rewritable portion 31 (e.g. e-paper display 31, 131) of display medium 34. FIG. 11 also illustrates rails 220A, 221A of conveying structure 210A aligned with side portion 32A of frame 33 of display medium 34 and rails 220B, 221B of conveying structure 210B aligned with side portion 32B of frame 33 of display medium 34. With this arrangement, side portions of 32A, 32B of display medium 34 can be releasably engaged without mechanically and/or electrically interfering with writing and/or erasing relative to the rewritable portion (e.g. passive e-paper display 31) of display medium 34. In one aspect, FIG. 11 also depicts that image 40 is partially written via writing unit 252 and depicts an erased portion 41 of e-paper display 31 preceding the writing of image 40.

FIG. 12 is side sectional view schematically representing a portion of a belt 600, according to one example of the present disclosure. In some examples, belt 600 corresponds to belts 230A, 230B as previously described in association with at least FIGS. 5A-11. As shown in FIG. 12, belt 600 includes a top layer 610, middle layer 612, and bottom layer 614. In some examples, the top layer 610 includes a display-engagement surface 630 to releasably engage a display medium (e.g. 34 in FIG. 3). In some examples, bottom layer 614 includes a gear-engagement surface 632 to engage a drive element for moving belt 600, such as drive element 240A, 241A in FIG. 5A.

In some examples, top layer 610 has a coefficient of friction substantially greater than a coefficient of friction of the slidable contact surface 218A, 219A of the respective conveying structures 210A, 210B. In some examples, the term "substantially greater" means at least one order of magnitude greater. In some examples, the term "substantially greater" means at least two orders of magnitude greater.

In some examples, the top layer 610 is made of a static discharge material. In some examples, the top layer 610 is made of a material having a compressability at least one order of magnitude greater than a compressibility of the bottom layer 614 and the middle layer 612.

In some examples, top layer 610 is made of a urethane 355A foam. In some examples, top layer 610 is insensitive to dust.

In some examples, middle layer 612 is sandwiched between top layer 610 and bottom layer 614, and includes a reinforcement structure to provide rigidity and strength to belt 600. In some examples, the reinforcement structure includes fiberglass and/or fiber materials. In some examples, the middle layer 612 is made of a resilient material having a stiffness at least one order of magnitude greater than the top layer 610.

In some examples, bottom layer 614 is made from a urethane material having a Shore A hardness of 80 A. In some examples, bottom layer 614 includes a top surface mechanically connected to middle layer 612 and includes a bottom surface 632. In some examples, drive-engagement surface 632 includes teeth for releasably engaging corresponding element (e.g. teeth) of a drive element, such as drive elements 240A, 241A in FIG. 5A. In some examples, bottom layer 614 comprises a 2GT type belt.

In some examples, belt 600 comprises a contiguous material forming an endless loop. However, in some examples, belt 600 comprises a series of links/linked elements which form an endless loop.

FIG. 13 is a block diagram schematically representing a control portion 660, according to one example of the present disclosure. In some examples, control portion 660 includes a controller 662 and a memory 670. In some examples, control portion 660 provides one example implementation of control portion 35 in FIG. 2.

Controller 662 of control portion 660 can comprise at least one processor 664 and associated memories that are in communication with memory 670 to generate control signals, and/or provide storage, to direct operation of at least some components of the systems, components, and modules described throughout the present disclosure. In some examples, these generated control signals include, but are not limited to, employing imaging manager 671 stored in memory 670 to manage imaging operations relative to a rewritable display medium in the manner described in at least some examples of the present disclosure.

In response to or based upon commands received via a user interface (e.g. user interface 690 in FIG. 14) and/or via machine readable instructions, controller 662 generates control signals to implement at least timing and sequence of the operation of erasing units, writing units, and relative movements therebetween in accordance with at least some examples of the present disclosure. In some examples, controller 662 is embodied in a general purpose computer while in other examples, controller 662 is embodied in the imaging devices described herein generally or incorporated into or associated with at least some of the components described throughout the present disclosure, such as control portion 35 (FIG. 2).

For purposes of this application, in reference to the controller 662, the term "processor" shall mean a presently developed or future developed processor (or processing resources) that executes sequences of machine readable instructions contained in a memory. In some examples, execution of the sequences of machine readable instructions, such as those provided via memory 670 of control portion 660 cause the processor to perform actions, such as operating controller 662 to implement at least erasing and/or other imaging-related functions (including writing), as generally described in (or consistent with) at least some examples of the present disclosure. The machine readable instructions may be loaded in a random access memory (RAM) for execution by the processor from their stored location in a read only memory (ROM), a mass storage device, or some other persistent storage, as represented by memory 670. In some examples, memory 670 comprises a volatile memory. In some examples, memory 670 comprises a non-volatile memory. In some examples, memory 670 comprises a computer readable tangible medium providing non-transitory storage of the machine readable instructions executable by a process of controller 662. In other examples, hard wired circuitry may be used in place of or in combination with machine readable instructions to implement the functions described. For example, controller 662 may be embodied as part of at least one application-specific integrated circuit (ASIC). In at least some examples, the controller 662 is not limited to any specific combination of hardware circuitry and machine readable instructions, nor limited to any particular source for the machine readable instructions executed by the controller 662.

FIG. 14 is a block diagram of a user interface 690, according to one example of the present disclosure. In some examples, user interface 690 provides for the simultaneous display, activation, and/or operation of at least some of the various components, modules, functions, parameters, features, and attributes of control portion 660 and/or the various aspects of erasing and/or writing operations, as described throughout the present disclosure. In some examples, at least some portions or aspects of the user interface 690 are provided via a graphical user interface (GUI). In some examples, user interface 690 includes an input 692 and a display 691, which may or may not be combined in a single element, such as a touch screen display.

FIG. 15 is a flow diagram 750 schematically representing a method 751 of manufacturing a belt drive, according to one example of the present disclosure. In some examples, method 751 is performed via at least some of the components, modules, elements, devices, etc. as previously described in association with at least FIGS. 1-14. In some examples, method 751 is performed via at least some components, modules, elements, devices, etc. other than those previously described in association with at least FIGS. 1-14.

At 752, method 751 comprises arranging at least one pair of spaced apart rails to extend in a first direction and define a gap, with each rail including a slidable contact surface. At 754, method 751 includes arranging a belt to be aligned with a gap and to be driven in an endless loop, with the belt including a first movable portion external to the gap vertically below the slidable contact surface of the rails and a second movable portion biased to be recessed within the gap vertically above the slidable contact surface of the rails. At 756, method 751 includes arranging a first segment of the second movably portion to be releasably engageable with a rewritable display medium to sandwich the display medium between the slidable contact surface of the rails and the first segment in a position external to the gap to enable the belt to move the display medium in the first direction for contact-less imaging via the ion-emitting unit.

In some examples, the at least one pair of rails comprises two pairs of rails, with each pair of rails comprising a portion of a conveying structure. With this arrangement, the method comprises arranging a pair of the conveying structures spaced apart from each other by a first distance in a second direction transversely relative to a first direction of a display medium travel path. In some examples, method 751 also comprises arranging the slidable contact surface of the rails to be spaced vertically below the ion-emitting unit.

At least some examples of the present disclosure are directed to a belt drive to provide relative movement of a rewritable display medium and an imaging module. At least some of the particular arrangements may enhance longevity of some components of the belt drive and may enhance quality imaging by providing consistent gap control and/or consistent velocity control.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A belt drive comprising:
at least one pair of spaced apart rails extending in a first direction and defining a gap; and
a belt aligned with the gap and to be driven in an endless loop, including a first movable portion external to the gap on a first side of the rails and a second movable portion biased to be recessed within the gap on an opposite second side of the rails,
wherein a rewritable display medium is releasably engageable in a sandwiched position between a slidable contact surface of the rails and a first segment of the second movable portion external to the gap to move the display medium in the first direction for contact-less imaging via a unit spaced from the rails.

2. The belt drive of claim 1, wherein the second movable portion includes at least one second segment other than the first segment, and wherein the at least one second segment is recessed within the gap at the same time that the first segment of the second movable portion is external to the gap.

3. The belt drive of claim 1, wherein each rail includes a first end portion and an opposite second end portion, wherein at least one of the respective first and second end portions defines an arcuate shape to enable insertion of a first end of the display medium between the second movable portion of the belt and the slidable contact surface of the rails.

4. The belt device of claim 3, comprising:
an entrance portion in communication with the first end portion of the rails and an exit portion in communication with the second end portion of the rails,
wherein the at least one of the entrance portion and the exit portion define a path extending at an acute angle relative to a plane through which the slidable contact surface of a middle portion of rails extends, wherein the acute angle is between about 0 to about 40 degrees.

5. The belt drive of claim 1, comprising:
a first guide positioned laterally external to one of the rails to slidably contact a first side edge of the display medium; and
a second guide positioned laterally external to the other respective rail to contact an opposite second side edge of the display medium, the second guide biased to move toward the first guide to thereby releasably constrain the display medium between the respective first and second guides while enabling movement of the display medium in the first direction.

6. The device of claim 1, wherein the belt comprises:
a bottom layer made of a generally rigid material to engage a drive element;
a top layer having a coefficient of friction substantially greater than a coefficient of friction of the slidable contact surface of the rails; and
a middle layer sandwiched between the respective top and bottom layers, the middle layer made of a resilient material having a stiffness at least one order of magnitude greater than the top layer.

7. The belt drive of claim 1, wherein the rewritable display medium includes a passive e-paper display, and wherein the belt drive comprises part of an imaging device in which the unit comprises an ion-emitting unit to direct airborne ions onto the passive e-paper display.

8. The imaging device of claim 7, wherein the ion-emitting unit includes a writing portion and an erasing portion, wherein the writing portion is spaced apart in the first direction from the erasing portion by a first distance.

9. The imager of claim 1, wherein the second movable portion includes at least one second segment other than the first segment, and wherein the at least one second segment is recessed within the gap at the same time that the first segment of the second movable portion is external to the gap.

10. An imager comprising:
an ion-emitting unit;
a pair of conveying structures spaced apart from each other by a first distance in a second direction transversely relative to a first direction of a display medium travel path, the conveying structures spaced vertically below the ion-emitting unit and each conveying structure including:
   at least one pair of spaced apart rails extending in a first direction and defining a gap, with each rail including a slidable contact surface; and
   a belt aligned with the gap and to be driven in an endless loop, including a first movable portion external to the gap vertically below the slidable contact surface of the rails and a second movable portion biased to be recessed within the gap vertically above the slidable contact surface of the rails,
with a first segment of the second movable portion to releasably engage a rewritable display medium to sandwich the display medium between the slidable contact surface of the rails and the first segment in a position external to the gap to enable the belt to move the display medium in the first direction for contact-less imaging via the ion-emitting unit.

11. The imager of claim 10, wherein the respective conveying structures are spaced apart from each other by a first distance, which is greater than a width of a passive e-paper display of the display medium.

12. The imager of claim 10, comprising
an entrance at one end of the rails and an exit at an opposite second end of the rails,
wherein the at least one of the entrance and exit define a path at an acute angle relative to the slidable contact surface of a middle portion of the rails, wherein the acute angle is between about 0 to about 40 degrees.

13. A method of manufacturing an imager, comprising:
arranging at least one pair of spaced apart rails extending in the first direction and defining a gap, with each rail including a slidable contact surface;
arranging a belt to be aligned with the gap and to be driven in an endless loop, with the belt including a first movable portion external to the gap vertically below the slidable contact surface of the rails and a second movable portion biased to be recessed within the gap vertically above the slidable contact surface of the rails; and
arranging a first segment of the second movably portion to be releasably engageable with a rewritable display medium to sandwich the display medium between the slidable contact surface of the rails and the first segment in a position external to the gap to enable the belt to move the display medium in the first direction for contact-less imaging via an ion-emitting unit.

14. The method of claim 13, wherein the at least one pair of rails comprises two pairs of rails, with each pair of rails comprising a portion of a conveying structure, the method comprising:
arranging a pair of the conveying structures spaced apart from each other by a first distance in a second direction transversely relative to a first direction of a display medium travel path; and
arranging the slidable contact surface of the rails to be spaced vertically below the ion-emitting unit by a distance to maintain a gap between the rewritable display medium and the ion-emitting unit.

15. The method of claim 13, comprising:
arranging an entrance portion with an entry path in alignment with and in communication with a first end portion of the slidable contact surface and arranging an exit portion with an exit path in alignment with and in communication with a second end portion of the slidable contact surface; and
arranging at least one of the entry path and the exit path to extend at an acute angle relative to a plane through which the slidable contact surface of a middle portion of the rails extends, wherein the acute angle is between about 0 to about 40 degrees.

* * * * *